(12) United States Patent
Hu

(10) Patent No.: US 7,862,757 B2
(45) Date of Patent: Jan. 4, 2011

(54) MANUFACTURING METHOD FOR SEAMLESS MANMADE LEATHER BALL

(76) Inventor: Liang-Fa Hu, No. 208, Jhongping Rd., Shengang Township, Taichung County 429 (TW)

( * ) Notice: Subject to any disclaimer, the term of this patent is extended or adjusted under 35 U.S.C. 154(b) by 12 days.

(21) Appl. No.: 12/076,899

(22) Filed: Mar. 25, 2008

(65) Prior Publication Data

US 2009/0243134 A1  Oct. 1, 2009

(51) Int. Cl.
- *B29C 43/18* (2006.01)
- *B29C 65/00* (2006.01)
- *B29C 70/70* (2006.01)

(52) U.S. Cl. .......... 264/248; 264/132; 264/254; 264/251; 264/275; 264/279.1; 264/293; 264/296; 264/294

(58) Field of Classification Search .......... None
See application file for complete search history.

(56) References Cited

U.S. PATENT DOCUMENTS

| | | | | |
|---|---|---|---|---|
| 3,256,019 A | * | 6/1966 | Barton | 473/597 |
| 3,405,018 A | * | 10/1968 | Way | 156/147 |
| 3,512,777 A | * | 5/1970 | Henderson | 473/597 |
| 5,320,345 A | * | 6/1994 | Lai et al. | 473/601 |
| 5,759,123 A | * | 6/1998 | Ou | 473/599 |
| 6,398,894 B1 | * | 6/2002 | Lee | 156/147 |
| 6,500,082 B1 | * | 12/2002 | Ou | 473/599 |
| 7,066,853 B2 | * | 6/2006 | Chang | 473/605 |

\* cited by examiner

*Primary Examiner*—Edmund H. Lee
(74) *Attorney, Agent, or Firm*—Jackson IPG PLLC; Demian K. Jackson

(57) ABSTRACT

A manufacturing method for seamless manmade leather ball, wherein composites such as soft bioplastic resin or manmade leather, etc are injected, extruded or hot compressed to form upper and lower half bowl type thin covers to completely matchingly sleeve and sphere the corresponding ball bladder, next it is pressingly combined in the one step or two steps curing molds to fusionly paste with the reinforcement layer on said ball bladder to become an initial blank with waterproof layer which is further pressingly combined and cooled down to a fixed form in another set of forming molds with its outside surface formed with pre-formed lines and is further treated with a surface cortex layer and put in forming molds once again allowing surface decorative lines to be pressingly combined at second time, thereby allowing the ball to appear a better simulated leather ball outlook.

8 Claims, 5 Drawing Sheets

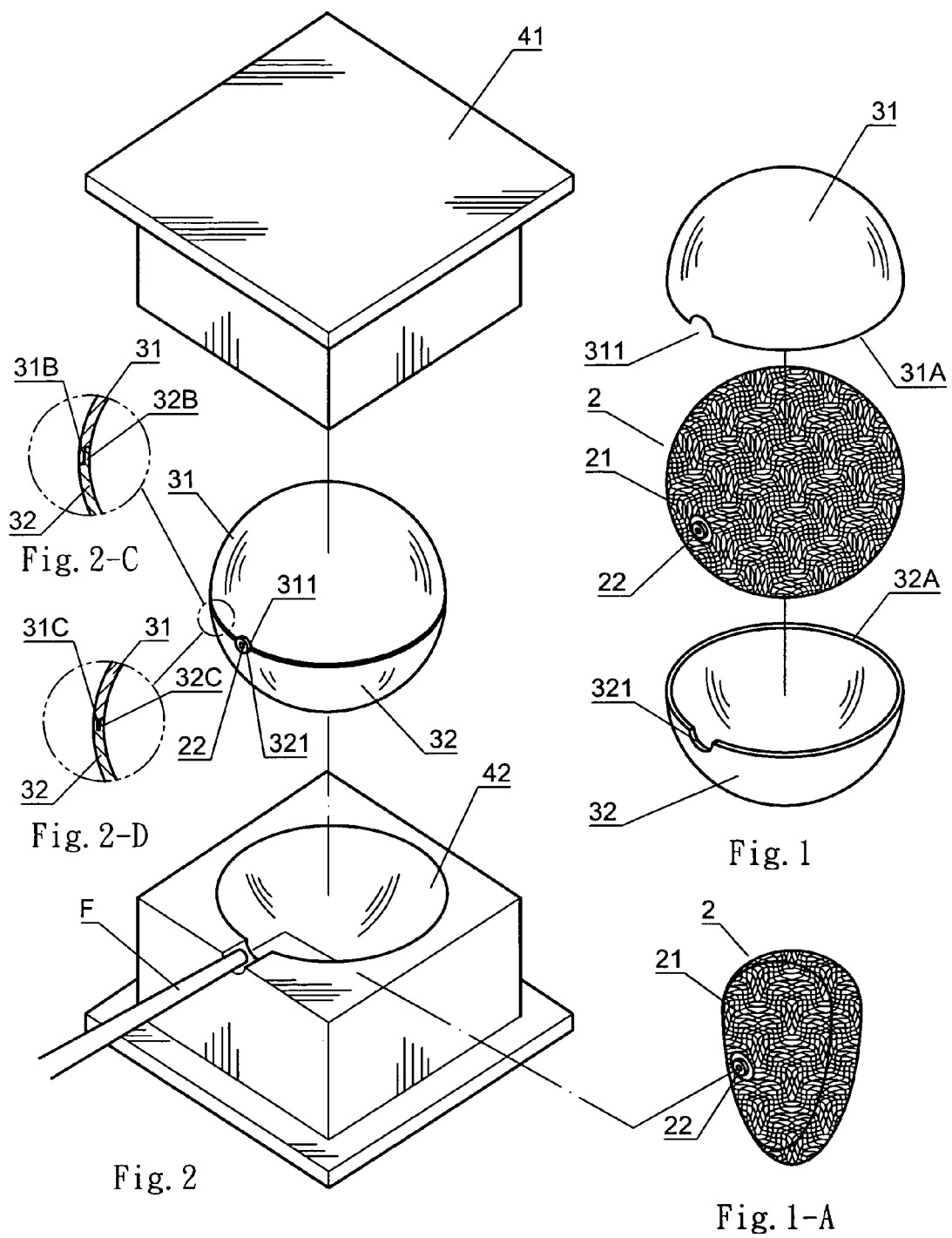

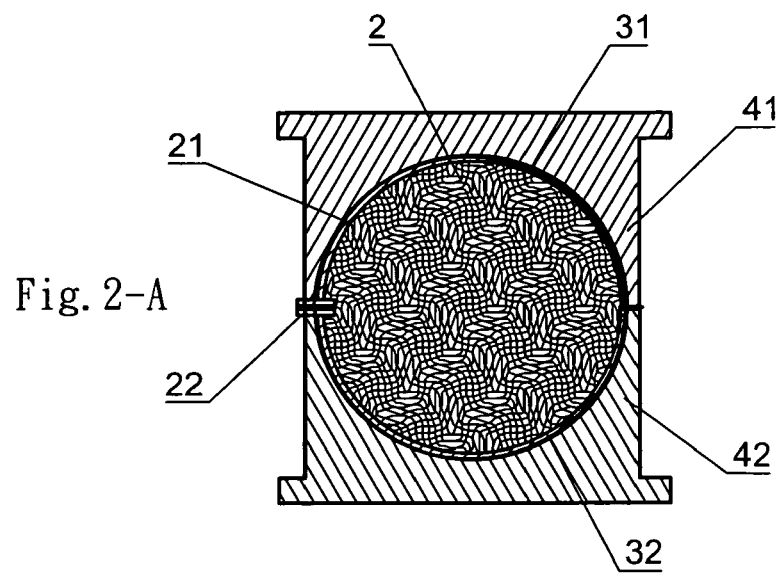
Fig. 2-A
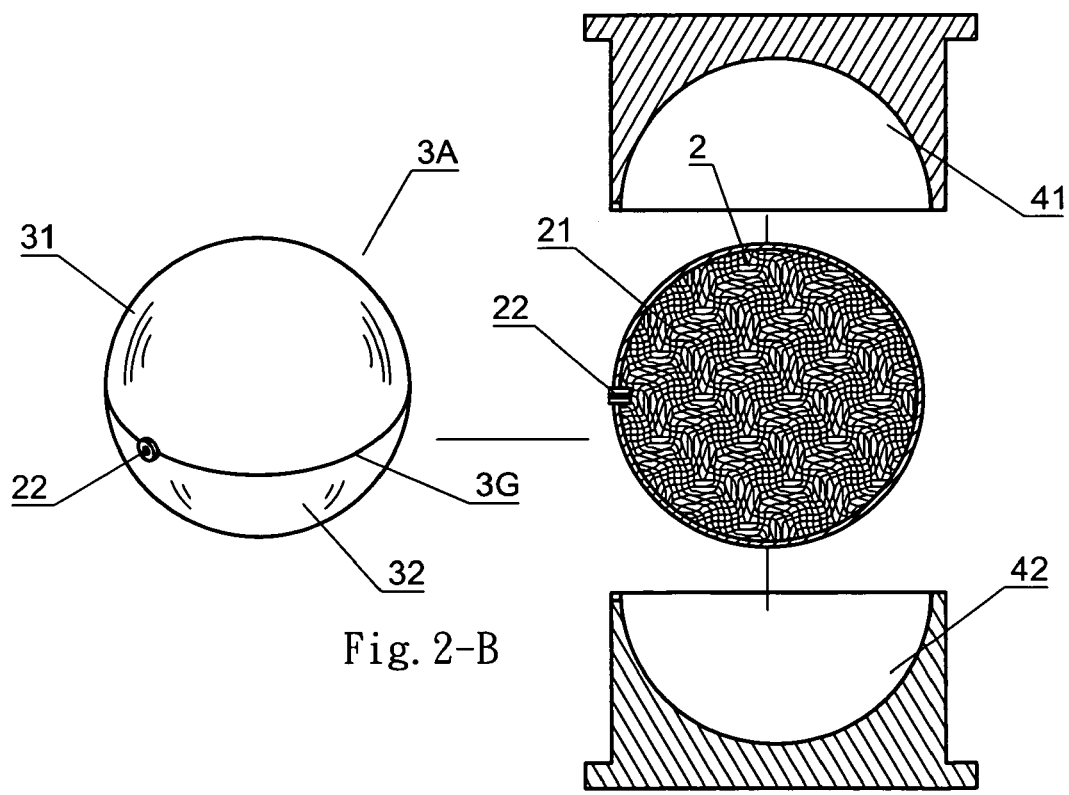
Fig. 2-B

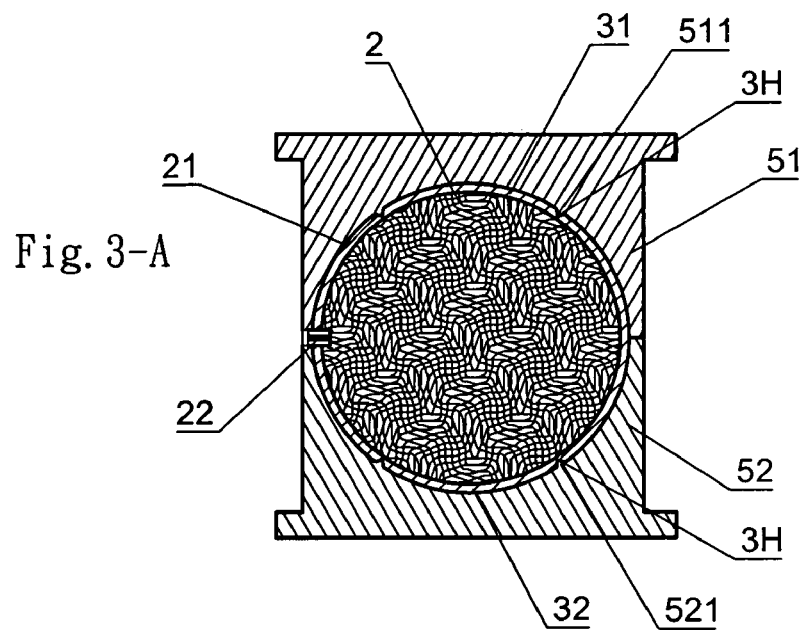
Fig. 3-A
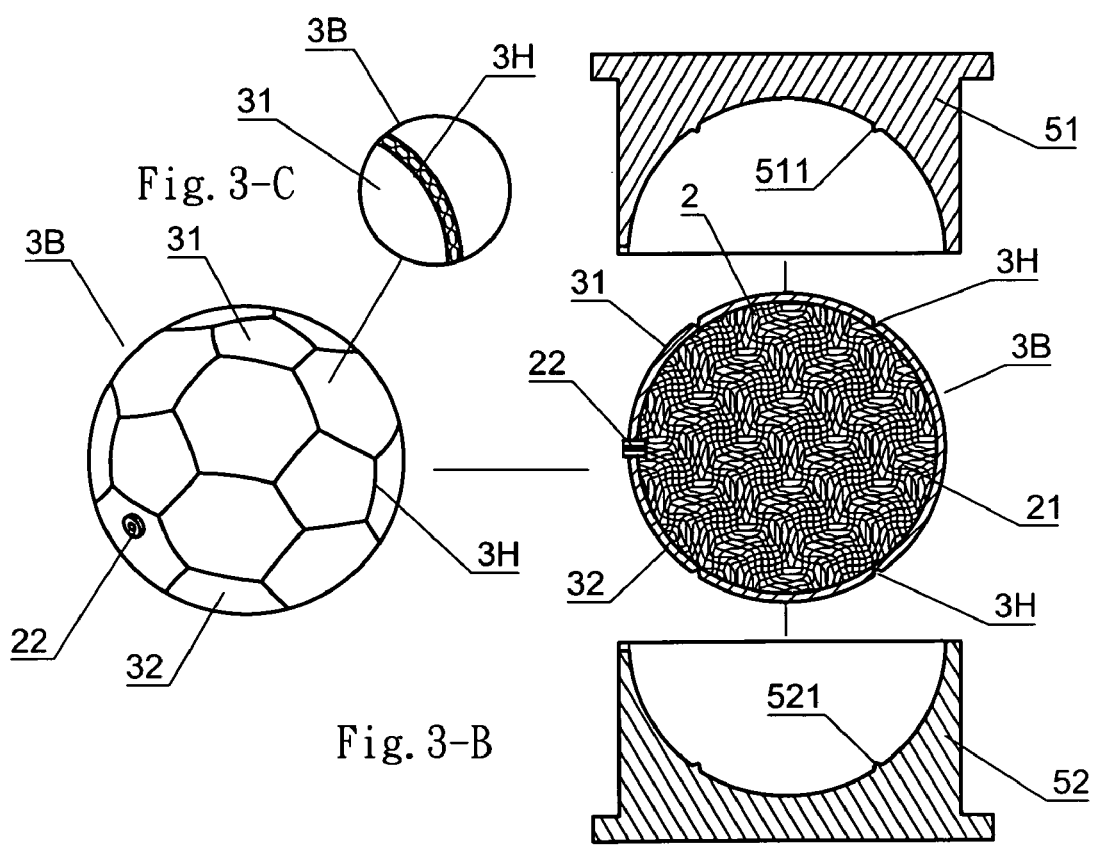
Fig. 3-C
Fig. 3-B

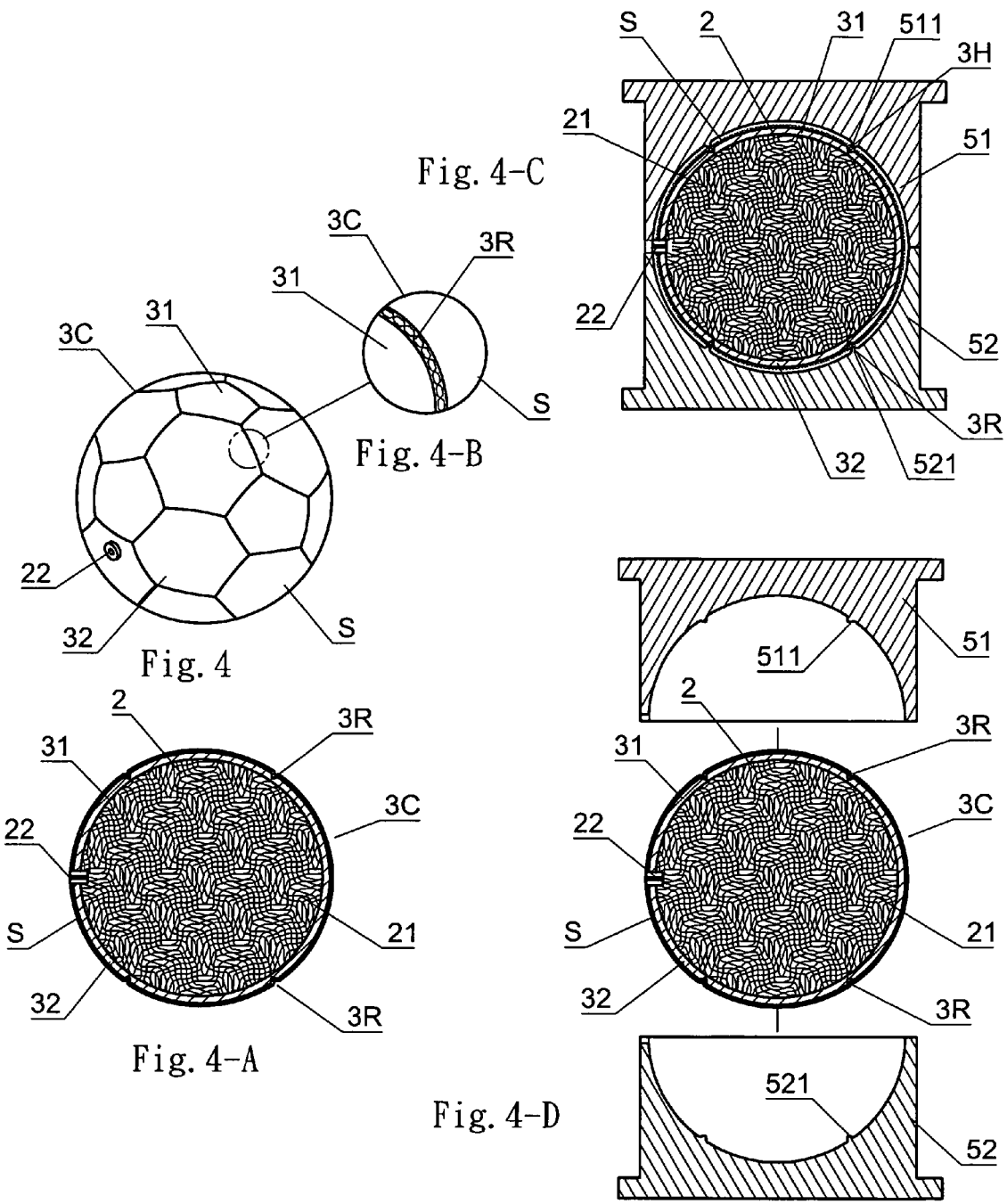

MANUFACTURING METHOD FOR SEAMLESS MANMADE LEATHER BALL

BACKGROUND OF THE INVENTION (a) Field of the Invention

The manufacturing method for seamless manmade leather ball of the invention is mainly disclosed to allow an inflatable ball bladder having a peripherally wrapped around binding yarn or cloth thereon to form a reinforcement layer to be formed to a seamless ball with a simulated leather surface, wherein its manufacturing method is mainly that composites such as soft bioplastic resin or manmade leather, etc are injected, extruded or hot compressed to form hemisphere shaped upper half bowl type thin cover and lower half bowl type thin cover to completely matchingly sleeve and sphere the corresponding ball bladder. Subsequently, said ball bladder enclosed by bowl type thin covers being put into the one step or two steps hemisphere shaped bowl type upper and lower matching curing molds is pressingly combined under the pressure of the same spherical shape and size and the high temperature curing condition suitable for resin compound softening or for foaming or not foaming resin compound, thereby allowing resin compound softening to fusionly paste with reinforcement layer on the peripheral outside of said ball bladder to become an initial blank with waterproof layer. Said initial blank while still hot can be put in another set of semi-spherical shaped bowl type upper and lower matching forming molds to be pressingly combined and cooled down to a fixed form, and various convex lines pre-made on the inside surfaces of forming molds form ball face pre-forming lines such as block shapes or seam lines on the peripheral surface of the initial blank, thereby forming a seamless base body. Next, surface of said base body is further cortex layer treated or is further put in the forming molds for pressingly combination by pre-made lines thereby allowing said ball body to appear an excellent simulated leather ball outlook.

(b) Description of the Prior Art

Inflated ball structures meeting the requirements for strong impact bearing, smooth rolling and roundness are usually made to a leather ball with ball cortex layer made by manual sewing, machine sewing, or piecewise pasted, as well as a true leather or a manmade leather sheet, wherein most of them are used in formal spots competitions such as foot ball games. However, due to complexity of processing cortex layer and precision requirement for said kinds of balls, besides of the major imperfections such as the incapability to effectively promote production and high price, the other disadvantages such as outlook defects such as degumming, drops off due to leather pasting method as well as poor waterproofing defects due to manual and machine sewing methods have caused rising demands and applicability in manmade leather balls with cheaper manufacturing costs.

In the conventional manufacturing method for manmade leather ball, the planetary leather or cloth is cut to pieces for separately pasting on or manually sewing, machine sewing on the outside of ball bladder ready to be inflated to a ball shape for use as the outer skin of the ball so as to form a ball with leather feeling and outlook. Nonetheless, conventional methods are mainly relied on manual pasting and sewing which has numerous processing procedures and complicated and have the imperfections to produce bad or non-uniform products. Especially there is a high waste ratio in the method of cutting pieces, hence regarding basic consideration in material cost, it is difficult to achieve economic effectiveness.

In addition, the first part of preparation work in cutting planetary leather or cloth to piecewise shapes as well as the succeeding work of pasting, manual sewing, machine sewing or piecewise printing operations all appear imperfections in processing complexities and unstable qualities causing unevenness on the ball body.

Especially for the spherical connecting outlook of concave seam lines which is normally stressed in true leather balls, the piecewise binding method is difficult to make overall tight closure or neatness on seaming areas, thereby usually causing serious defects in the outlook effect, quality sense, applicability and especially strength of ball structure due to unavoidable human errors by operators.

SUMMARY OF THE INVENTION

The invention is mainly purposed to disclose a manufacturing method for seamless manmade leather ball, wherein composites such as soft bioplastic resin or manmade leather, etc are injected, extruded or hot compressed to form the upper and lower half bowl type thin covers to wrap around the peripheral outside of the ball bladder. Said ball bladder being further put into the one step or two steps hemisphere shaped bowl type upper and lower matching curing molds is pressingly combined under pressure and the high temperature curing condition suitable for resin compound softening or for foaming or not foaming resin compound, thereby allowing said thin covers to fusionly paste with reinforcement layer on the peripheral outside of said ball bladder so as to become an initial blank with waterproof layer. Said initial blank while still hot is put in another set of semi-spherical shaped bowl type upper and lower matching forming molds to be pressingly combined under pressure and cooled down to a fixed form, while various convex lines pre-made on the inside surfaces of forming molds form ball face pre-forming lines such as block shapes or seam lines on the peripheral surface of the initial blank, thereby forming a seamless base body. Finally, surface of said base body is further cortex layer treated to complete the ball manufacture, hence it is characterized in that imperfections such as manual sewing and complicated and time consuming process can be completely eliminated by said manufacturing process, the economic effectiveness resulted from cost reduction due to concrete manufacture simplification is very obvious.

The secondary purpose of the invention is to disclose a manufacturing method for seamless manmade leather ball, wherein the ball bladder of the ball body continuously pressingly combined by curing molds and forming molds is mainly wholly sleevedly enclosed by composites of soft bioplastic resin compound or manmade leather to gain structural tightness, and further the ball diameter, roundness specification and outlook of the ball body pressingly combined by fixed molds are quite precise and stable, especially it is characterized in that there is totally no connecting seams on the surface with good waterproof characteristics and the applicability of said manmade leather ball is obviously promoted.

The third purpose of the invention is to disclose a manufacturing method for seamless manmade leather ball, wherein the upper and lower half bowl type thin covers are made of composites such as bioplastic resin compound or manmade leather to be selectively preformed by injection, extrusion or hot compression method into pre-form covers which has the advantages of stable thickness specifications and uniformness. It is characterized in that the ball made by this manufacturing process has excellent standardizations and stability effects in various ball conditions such as straightness, ball wall thickness, and elasticity, etc. that is particularly suitable for formal contests use for conforming to the requirement of fair competition.

The fourth purpose of the invention is to disclose to disclose a manufacturing method for seamless manmade leather ball, wherein it is characterized in that the upper and lower bowl type thin covers are pre-formed by injection method without having to pass through the leather cutting process in conventional manual sewing balls, so that not only that the complexity and inconvenience of typesetting and cutting can be avoided, but also the excellent economic benefits of no waste generation in the manufacturing process and are completely incomparable by the conventional manual or machine sewing balls.

The fifth purpose of the invention is to disclose a manufacturing method for seamless manmade leather ball, wherein it is characterized in that the ball continuously pressingly combined by curing molds and forming molds can be further treated by transfer printing, shift printing, or pasting trademark, and ball surface can be further treated by cortex layer to be further put in forming molds to be pressingly combined by pre-made lines. As such, the ball surface and its compressed lines appear more compact and clearer to present an excellent simulated outlook and quality feel of a true leather ball.

BRIEF DESCRIPTION OF THE DRAWINGS

FIG. 1 is a perspective decomposition view of the base material of the invention.

FIG. 1-A is a perspective schematic view of a ball bladder before inflation.

FIG. 2 is a perspective schematic view of the curing molds for pressing combination of the bowl type thin covers and a ball bladder.

FIG. 2-A is a cross-sectional view of the curing molds for pressing combination of the bowl type thin covers and a ball bladder.

FIG. 2-B is a cross-sectional schematic and comparative perspective view showing the curing molds in pressing combination.

FIG. 2-C is a cross-sectional view showing other embodiment of middle section seam edges of bowl type thin coverers.

FIG. 2-D is a cross-sectional view showing another embodiment of middle section seam edges of bowl type thin coverers.

FIG. 3-A is a cross-sectional view of forming molds for base body pressing combination.

FIG. 3-B is a cross-sectional view showing forming molds in pressing combination and a comparative perspective view of initial blank.

FIG. 3-C is an enlarged view showing pre-made lines on initial blank surface.

FIG. 4 is a perspective schematic view showing a manmade leather ball after cortex layer treatment.

FIG. 4-A is a cross-sectional schematic view showing a manmade leather ball after cortex layer treatment.

FIG. 4-B is an enlarged view showing a manmade leather ball after cortex layer treatment.

FIG. 4-C is a cross-sectional view showing a manmade leather ball is pressingly combined by forming molds.

FIG. 4-D is a cross-sectional schematic view showing a manmade leather ball after pressingly combined by the forming molds.

DETAIL DESCRIPTION OF THE PREFERRED EMBODIMENTS

Figure 3:
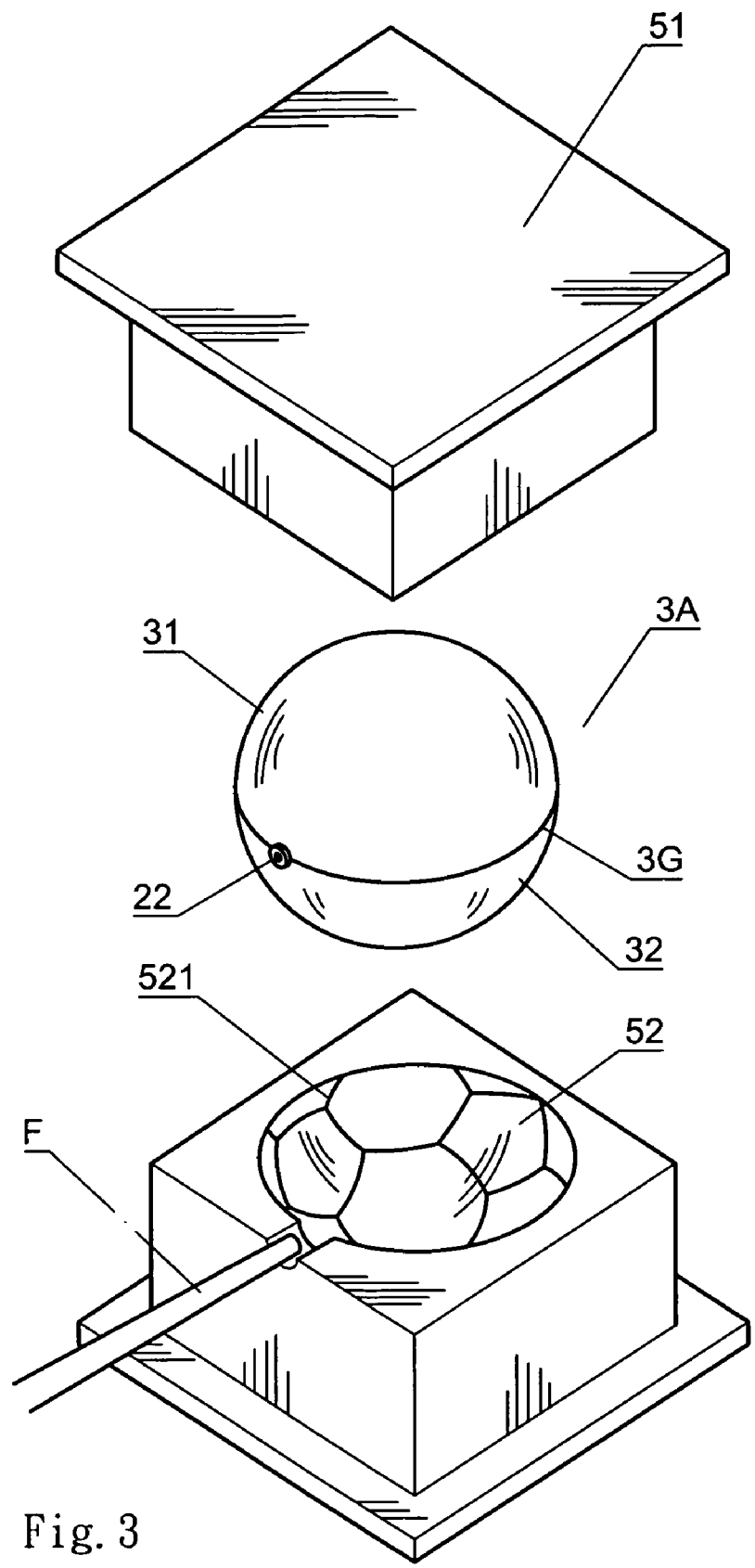
FIG. 3 is a perspective decomposition view of forming molds for base body pressing combination.

First, referring to FIG. 1 and FIG. 1-A: The basic material used in this application case mainly comprises a inflatable ball bladder 2 having a peripherally wrapped around binding yarn or cloth thereon to form a reinforcement layer 21 is protrudingly made with an air charging inlet 22, wherein the manufacturing method of the invention is:

Composites such as soft bioplastic resin or manmade leather, etc are injected, extruded or hot compressed to form hemisphere shaped upper half bowl type thin cover 31 and lower half bowl type thin cover 32 to completely matchingly sleeve and sphere the corresponding ball bladder 2 ready for inflation to ball shape, wherein seam edges of upper and lower bowl type thin covers 31, 32 are matchingly respectively provided with half openings 311, 321 to allow front end of charging tube F to alignedly insert into the air charging inlet 22 on top end of the ball bladder 2 inside the matching molds, thereby to inflate said ball bladder into a ball shape;

Subsequently, as referring to FIG. 2, said ball bladder enclosed by bowl type thin covers 31, 32 being put into the hemisphere shaped curing molds 41, 42 (as shown in FIGS. 2-A) being capable of opening and closing in vertical direction and having a temperature heating control device is pressingly combined under the pressure of the same spherical shape and size and at the medium temperature condition set to suit for resin compound softening for softening the resin content of said thin covers 31, 32 to paste with reinforcement layer 21 and thereby making the corresponding middle section seam edges to be integrated into one, and allowing inside surfaces of thin covers 31, 32 to fusionly paste on the periphery of ball bladder 2 (referring to FIG. 2-B) so as to become the initial blank 3A;

Secondly, said initial blank 3A while being continuous pressingly combined can be through the temperature control device of the same curing molds 41, 42 (still illustrated by FIG. 2-A) to raise the temperature thereof up to the high temperature curing condition for foaming or not foaming resin compound; or the said initial blank 3A is removed from said curing molds 41, 42 to be further put in another curing molds 41, 42 with temperature set to high temperature curing condition for foaming or not foaming resin compound to be further pressingly combined under the pressure of the same ball shape and size, and at the high temperature for curing, i.e. the ball bladder is completely pasted by said thin covers 31, 32 at the external periphery thereof to become an initial blank 3A with water proof layer, and further after the curing molds 41, 42 (still illustrated by FIG. 2-B) are opened, the initial blank 3A with completely adapted water proof middle layer and reinforcement layer.

According to the selection of different resin compounds for use, the operation for pressing combination curing by said curing molds 41, 42 in the said second procedure for high temperature curing can be changed to that initial blank 3A after completing the pasting combination by softening resin compound in the first set of medium temperature curing molds 41, 42 is removed and further put in a heating oven for baking type curing operation thereby to obtain the initial blank 3A with completely adapted water proof middle layer and reinforcement layer;

Material of said bowl type thin covers 31, 32 can be rubber, plastic, silicone or their compounds or manmade leather of thermoplastic resins or soft bioplastic resins directly, wherein various applicable types of initial blanks 3A set to partially foaming or non-foaming conditions can be made by optionally adding foam agents and matchingly adjusting the processing conditions such as temperature or pressing time of the curing molds 41, 42 according to types or characteristics of the ball to be manufactured.

Further, for said upper and lower half bowl type thin covers 31, 32 preformed by injection, extrusion or hot compression method, the corresponding middle section seam edges 31A, 32A thereof can be made to flat shapes (as shown in FIG. 1), wherein due to same composites of soft bioplastic resin compounds or manmade leather, they can be mutually fusionly softened by heat for pasting connection, and in considering the improvements on straightness or accuracy of the mutual pasted seams, said corresponding middle section seam edges 31B, 32B of said upper and lower bowl type thin covers 31, 32 can be made to notches of complementary thicknesses (as shown in FIG. 2-C), or said corresponding middle section seam edges 31C, 32C can be made to wedge openings of complementary concave-convex shapes (as shown in FIG. 2-D), thereby ensuring straightness and sphere roundness on the seam joint between said upper and lower bowl type thin covers 31, 32.

Furthermore, as referring to FIG. 3: said initial blank 3A while still hot can be put in another set of semi-spherical shaped bowl type forming molds 51, 52 being capable of opening and closing in vertical direction for pressing combination, formation and cooling treatment once again, wherein inside surfaces of forming molds 51, 52 for low temperature and cooling use are designed to pre-form different types of shaping blocks thereon or distributed seams alike convex or concave engraved lines 511, 521 thereon according to ball outlook or modeling, whereby said upper and lower bowl type thin covers 31, 32 with residual warm, slightly melting and thermoplastic surfaces are pressingly combined by said forming molds 51, 52 (as shown in FIG. 3-A) to form overall distributed shaping blocks or reversed seam lines of concave or convex pre-made lines 3H (as shown in FIG. 3-C) on the peripheral outside of said initial blank 3A after the molds are reopened (as shown in FIG. 3-B), thereby allowing a seamless base body 3B of good structure tightness to be manufactured.

The inner sides of said forming molds 51, 52 can be matchingly installed with rapid cooling auxiliary equipment such as a water cooling device, so that after pre-made lines 3H on the ball outside surface are pressingly combined and formed, surface plastic material of initial blank 3A can be more rapidly cooled down to the base body 3B which is no more thermoplastic and deformable thereby helping the modeling stabilization effect and accelerating the processing time.

Further referring to FIG. 4, FIG. 4-A and FIG. 4-B: surface of base body can be further selectively soaked, spray coated, smeared, or wrapped by a leather film for transparent or non-transparent surface cortex layer S treatment by manmade leather material to complete the manmade leather ball 3C manufacture, wherein pre-made lines area covered by said cortex layer S of the same thickness is formed to decorative lines 3R of same concaveness.

It is further referred to FIG. 4: Regarding the solution to the phenomenon that some concave area of decorative lines 3R on said manmade leather ball 3C after cortex layer S treatment may be partially filled up by excessive cortex layer S coating, said manmade leather ball 3C is put in forming molds 51, 52 once again for allowing surface decorative lines 3R to be pressingly combined by said pre-made lines 511, 512 at second time (as shown in FIG. 4-C), thereby allowing said manmade leather ball 3C surface and its decorative lines 3R thereon to appear a better simulated leather ball outlook with more compactness and clear concaveness after the molds are reopened (as shown in FIG. 4-D).

The surface of manmade leather ball 3C being continuously pressingly combined by curing molds 41, 42 and forming molds 51, 52 can be further treated with lines and graphs such as transfer printing, shift printing, or pasting trademark, and said ball surface can be further coated by cortex layer S and further pressingly combined again, so that surface lines and graphs are simultaneously protected by the transparent cortex layer S to achieve the unwearable marking and beautification purposes.

Furthermore, regarding installations and preparation for thin covers 31, 32, besides of the two hemisphere bowl types, four or eight pieces combination can also be made, as long as the peripheral outside of ball bladder 2 is enclosed, the thin covers 31, 32 made of same composite material such as soft resin compound or manmade leather are heatedly softened to mutually fusionly pasted to a ball shape, wherein said technical contents are equivalent to the scope of the invention.

On the other hand, thin covers are installed and prepared according to proper shape and size of peripheral outside of the ball bladder, wherein if ball types other than circular shapes such as a long ellipse type ball bladder (such as American football), or a pomelo type ball bladder (such as boxing practicing ball) is adopted and corresponding thin covers, curing molds and forming molds are selected, therefore aforesaid manufacturing methods, devices and operation can be used to manufacture the seamless manmade leather ball, wherein it is the technical operation equivalent to the scope of the invention.

In addition, the ring shaped connecting seams 3G (as shown in FIG. 2-B) at external middle section of initial blank 3A are cured and fusionly formed by the corresponding middle section seam edges 31A, 32A after pressing combination by curing molds 41, 42 of thin covers 31, 32. To solve the presence of said connecting seams 3C, corresponding connecting edges of forming molds 51, 52 can be serpentine or convex-concave arranged according to positions of pre-made lines 511, 512, thereby allowing said connecting seams to be hidden among decorative lines 3R, and the original connecting seams S can be smoothed out to disappear after forming treatment by forming molds 51, 52 (as shown by the base body 3B in FIG. 2-B) so as to give said ball shape an excellent quality feel as a leather ball.

I claim:

1. A manufacturing method for a seamless manmade leather ball comprising an inflatable ball bladder having a binding yarn or cloth thereon peripherally wrapped to form a reinforcement layer, protrudingly made with an air charging inlet, wherein the manufacturing method further comprises:

injecting, extruding, or hot compressing a soft bioplastic resin or manmade leather to form an upper and lower hemisphere shaped thin cover each having a middle seam edge;

enclosing the inflatable ball bladder into the upper and lower hemisphere shaped thin covers to form a sphere;

placing said sphere into a first curing mold, where said first curing mold comprises two hemisphere shaped molds capable of opening and closing in a vertical direction, said first curing mold further comprising a temperature heating control device operative to adjust the temperature applied by said first curing mold;

pressing to combine said first curing mold under a medium temperature suitable to soften any resin content of said hemisphere shaped thin covers to paste the middle seam edges between the upper and lower hemisphere shaped thin covers to form an integrated unit;

continuing to press first curing mold until the inside surfaces of said hemisphere shaped thin covers are pasted and fused onto the periphery of said ball bladder to form an initial blank;

subsequently removing and placing said initial blank in a second curing mold, said second curing mold further comprising a temperature heating control device operative to adjust the temperature applied by said second curing mold;

raising the temperature of said second curing mold to a high temperature suitable to induce a curing condition for any resin content of said initial blank and a complete pasting of said thin covers at the external periphery thereof to form a waterproof layer upon said initial blank;

subsequently placing said blank with waterproof layer, into a forming mold capable of opening and closing in a vertical direction, said forming mold adapted to apply a low temperature suitable to impress designs upon the blank with waterproof layer, said designs further comprising any combination of: preformed shaping blocks or convex distributed seams;

pressing the forming mold upon said blank with waterproof layer to form a seamless base body impressed with designs of reverse shape or reverse concavity with respect to the designs adapted by said forming mold;

subsequently applying a cortex treatment to the surface of said seamless base body, said cortex treatment comprising any combination of: soaking, spray coating, smearing, or leather film wrapping the surface of said seamless base body;

subsequent to the application of the first and second curing molds, impressing serpentine or convex-concave shaped lines arranged to allow connecting seams of the blank with waterproof layer to be hidden among the lines by said forming mold; and smoothing out the connecting seams of the blank with waterproof layer after treatment by said forming mold.

2. The manufacturing method of claim 1, wherein said second curing mold comprises a heating oven for a curing operation to form the waterproof layer upon the initial blank.

3. The manufacturing method of claim 1, wherein the middle seam edges of the upper and lower hemisphere shaped thin covers are matched with respect to half openings of the upper and lower hemisphere shaped thin covers to allow a front end of a charging tube to align and insert into an air charging inlet, said air charging inlet positioned on the top end of said ball bladder; and where said ball bladder is further inflated into a ball shape.

4. The manufacturing method of claim 1, wherein the middle section seam edges of said hemisphere shaped upper and lower thin covers are made to be flat shapes, notches of complementary thicknesses, or wedge opening of complementary concave-convex shapes.

5. The manufacturing method of claim 1, wherein the inner sides of said forming molds are matchingly installed with rapid cooling auxiliary equipment, so that after pre-made lines on the ball outside surface are pressingly combined and formed, the surface material of said initial blank is more rapidly cooled down to the base body thereby stabilizing the base body and accelerating the processing time.

6. The manufacturing method of claim 1, wherein the temperatures and pressing time applied to said upper and lower hemisphere shaped thin covers are matchingly adjusted according to the characteristics of the ball to be manufactured.

7. The manufacturing method of claim 1, wherein said ball surface is further treated with lines and graphs, shift printing, or pasting trademarks, and said ball surface is further coated by a cortex layer and further pressingly combined again, so that surface lines and graphs are simultaneously protected by the cortex layer to render ball markings resilient to wear.

8. The manufacturing method of claim 1, wherein the upper and lower hemisphere shaped thin covers comprise a combination of four or eight thin covers.

* * * * *